(12) United States Patent
Hoefken et al.

(10) Patent No.: US 9,393,534 B2
(45) Date of Patent: Jul. 19, 2016

(54) HORIZONTAL AGITATOR

(71) Applicant: INVENT UMWELT-UND VERFAHRENSTECHNIK AG, Erlangen (DE)

(72) Inventors: Marcus Hoefken, Erlangen (DE); Thomas Hagspiel, Postbauer-Heng (DE)

(73) Assignee: INVENT UMWELT-UND VERFANRENSTECHNIK AG, Erlangen (DE)

( * ) Notice: Subject to any disclaimer, the term of this patent is extended or adjusted under 35 U.S.C. 154(b) by 158 days.

(21) Appl. No.: 14/389,152

(22) PCT Filed: Mar. 20, 2013

(86) PCT No.: PCT/EP2013/055840
§ 371 (c)(1),
(2) Date: Sep. 29, 2014

(87) PCT Pub. No.: WO2013/143946
PCT Pub. Date: Oct. 3, 2013

(65) Prior Publication Data
US 2015/0049576 A1  Feb. 19, 2015

(30) Foreign Application Priority Data

Mar. 30, 2012 (DE) .......................... 10 2012 205 269

(51) Int. Cl.
*B01F 7/06* (2006.01)
*B01F 7/00* (2006.01)
(Continued)

(52) U.S. Cl.
CPC . *B01F 7/06* (2013.01); *B01F 7/001* (2013.01); *B01F 7/00033* (2013.01); *B01F 7/00041* (2013.01); *B01F 7/00733* (2013.01);
(Continued)

(58) Field of Classification Search
CPC .. B01F 7/00033; B01F 7/00041; B01F 7/001; B01F 7/00733; B01F 7/06; B29L 2031/08
See application file for complete search history.

(56) References Cited

U.S. PATENT DOCUMENTS

| | | | |
|---|---|---|---|
| 3,865,509 A | 2/1975 | Frazzell et al. | |
| 4,722,608 A * | 2/1988 | Salzman ............ | B01F 7/00016 366/270 |

(Continued)

FOREIGN PATENT DOCUMENTS

| | | |
|---|---|---|
| DE | 29806668 U1 | 7/1998 |
| DE | 102007008135 A1 | 8/2008 |
| EP | 0641595 A1 | 3/1995 |

OTHER PUBLICATIONS

PCT, "International Search Report for International Application No. PCT/EP2013/055840", Form PCT/ISA/210, 2pgs, dated Jun. 26, 2013.

(Continued)

*Primary Examiner* — Tony G Soohoo
(74) *Attorney, Agent, or Firm* — Manabu Kanesaka

(57) ABSTRACT

The invention relates to a horizontal agitator for producing a substantially horizontal flow in a wastewater treatment tank, a propeller being installed on a polygonal shaft driven by means of a submersible motor, wherein the propeller is produced form a first material, which is formed from a polymer reinforced with first fibers, and as hub has a sleeve which corresponds to the outer shape of the polygonal shaft and which is produced from a second material which is different from the first material.

8 Claims, 3 Drawing Sheets

(51) Int. Cl.
  *F16D 1/10*   (2006.01)
  *B29L 31/08*  (2006.01)
(52) U.S. Cl.
  CPC .............. *F16D 1/10* (2013.01); *B29L 2031/08* (2013.01); *F16D 2001/102* (2013.01); *F16D 2200/006* (2013.01)

(56) References Cited

U.S. PATENT DOCUMENTS

| | | | |
|---|---|---|---|
| 4,797,066 A | 1/1989 | Stromberg | |
| 4,842,483 A | 6/1989 | Geary | |
| 5,112,192 A * | 5/1992 | Weetman | B01F 7/00341 366/325.4 |
| 5,385,448 A * | 1/1995 | Merkt | B01F 7/001 366/330.5 |
| 2006/0280028 A1 | 12/2006 | West et al. | |
| 2009/0081044 A1 | 3/2009 | Corcoran | |
| 2010/0096343 A1 | 4/2010 | Hoefken | |
| 2010/0133174 A1* | 6/2010 | Hoefken | B01F 7/0005 210/512.3 |

OTHER PUBLICATIONS

Niemann, Gustav: Maschinenelemente, vol. 1, 2nd edition, Berlin et al; Springer, 1981, p. 377, ISBN: 3-540-06809.0.

Salzman R N et al; Dynamic Mixers Turn More to Reinforced Plastics:, Chemical Engineering Progress, American Insitute of chemical Engineers, NewYork, NY, US, vol. 87, No. 6, Jun. 1, 1991; pp. 39-44; ISSN? 0360-7275.

* cited by examiner

HORIZONTAL AGITATOR

RELATED APPLICATIONS

The present application is National Phase of International Application No. PCT/EP2013/055840 filed Mar. 20, 2013, and claims priority from German Application No. 10 2012 205 269.0, filed Mar. 30, 2012.

The invention relates to a horizontal agitator for producing a substantially horizontal flow in a wastewater treatment tank.

A horizontal agitator of this type is known from WO 2008/101632 A1. The known horizontal agitator is installed on a post supported in the wastewater treatment tank. It has a submersible motor. A shaft driven thereby is connected by means of a feather key connection to the hub of a propeller. With the feather key connection the torque of the shaft is transmitted to the propeller substantially via the feather key. Here, considerable forces are effective in the region of the feather key and may damage the feather key connection. Aside from this, the dismounting of the propeller in the case of the feather key connection is generally complex and time-consuming.

The object of the invention is to overcome the disadvantages according to the prior art. In particular, a horizontal agitator that is as durable as possible for producing a substantially horizontal flow in a wastewater treatment tank is to be specified, with which a potential necessary exchange of a propeller is possible with reduced effort.

This object is achieved by the features of Claim 1. Expedient embodiments of the invention will emerge from the features of Claims 2 to 11.

In accordance with the invention, a horizontal agitator for producing a substantially horizontal flow in a wastewater treatment tank is proposed, with which a propeller is installed on a polygonal shaft driven by means of a submersible motor, wherein the propeller is produced from a first material, which is formed from a polymer reinforced with first fibres, and as hub has a sleeve which corresponds to the outer shape of the polygonal shaft and which is produced from a second material which is different from the first material.

In contrast to the prior art, it is proposed in accordance with the invention to use a polygonal shaft in a horizontal agitator for connection to the propeller. A polygonal shaft has a polygonal profile, which for example may have three or four transmission surfaces. In the case of a polygonal shaft, the forces are transmitted by surface contact. Here, the contact pressure increases slowly up to a maximum value and then falls again steadily. Due to the gentle transitions between the transmission surfaces, a notch effect is to be disregarded. Furthermore, the propeller is produced from polymer reinforced with first fibres. Such a propeller has a relatively low weight. With the proposed horizontal agitator, the propeller can be exchanged quickly and easily. The proposed connection between the submersible motor and the propeller by means of a polygonal shaft is particularly durable.

In accordance with an advantageous embodiment of the invention, the second material is formed from a polymer reinforced with second fibres. The second fibres are expediently carbon fibres or aramid fibres. It has surprisingly been found that in particular a sleeve produced from polymer reinforced with carbon fibres has a sufficient strength to receive the forces transmitted from the polygonal shaft.

The second fibres are advantageously continuous fibres. In this case, the sleeve is expediently produced by winding and laminating the second fibres around a core corresponding to the shape of the polygonal shaft. The production of such a sleeve requires a relatively low level of effort.

The sleeve is expediently adhesively bonded to the first material. Due to the proposed production of the sleeve from a polymer reinforced with second fibres, it is possible to create an integrally bonded connection in a conventional manner with the polymer used for production of the propeller. Such an integrally bonded connection is characterised by excellent strength.

In accordance with a further advantageous embodiment of the invention, the first fibres are glass fibres. Glass fibres are available relatively inexpensively. The glass fibres are expediently provided in the form of woven fabrics or knitted fabrics. The propeller can thus be produced relatively inexpensively on the whole.

In accordance with a further particularly advantageous embodiment of the invention, a surface of the propeller is coated at least in portions with a layer produced from a third material. The third material is advantageously formed from polymer reinforced with second carbon fibres. The third material is advantageously applied in particular in those portions of the surface that are exposed to particularly high forces, in particular abrasive forces or the like. However, the layer can also surround the entire outer surface of the propeller.

The second carbon fibres are advantageously present in the form of a woven fabric, knitted fabric or short fibres. That enables a relatively simple production of a relatively thin layer made of the third material.

In accordance with an alternative embodiment, the second material may also be produced from steel, preferably from stainless steel.

Exemplary embodiments of the invention will be explained in greater detail hereinafter on the basis of the drawings, in which.

Figure 1:
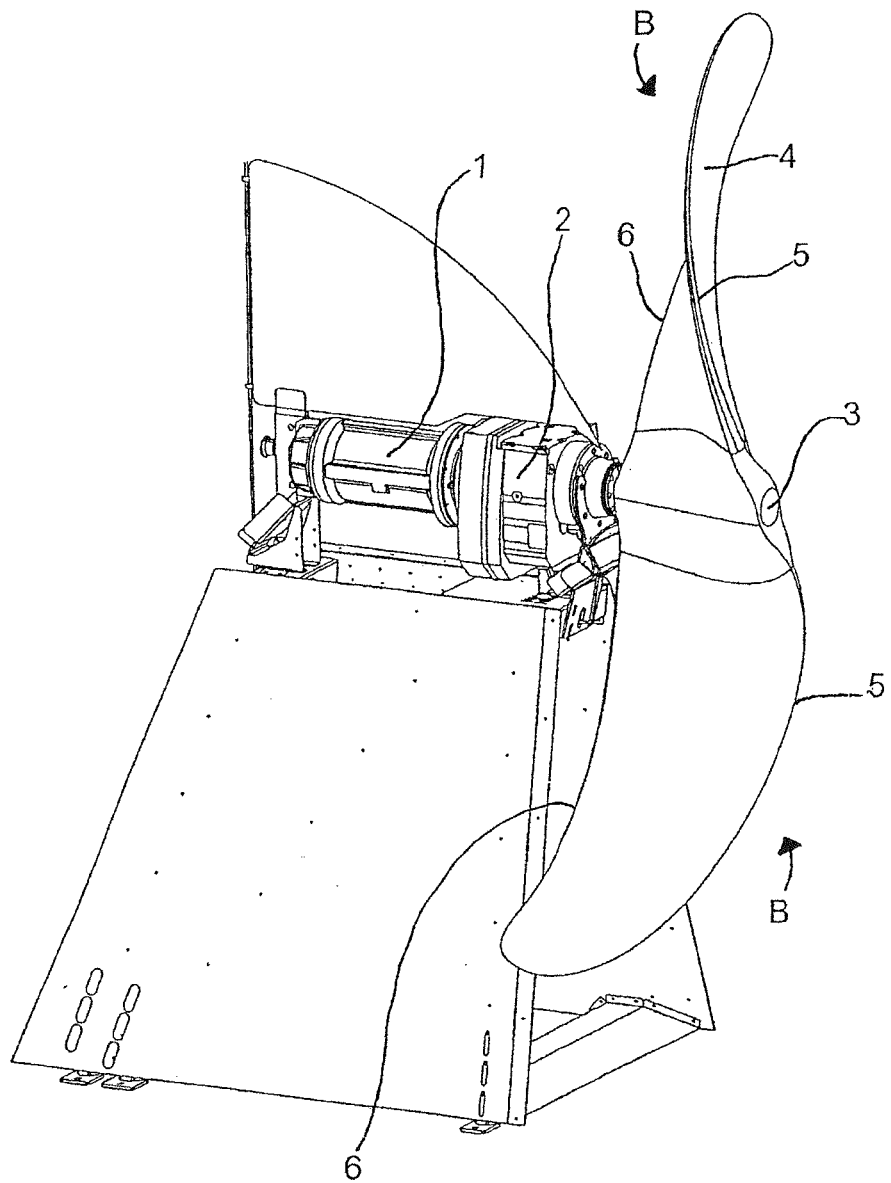
FIG. 1 shows a perspective view of a horizontal agitator.

In the case of the horizontal agitator shown in FIG. 1, a submersible motor 1 is connected in terms of drive to a gearing 2. A polygonal shaft 3 (not shown here in detail), on which a propeller 4 is installed, extends from the gearing 2. The propeller 4 has two blades B with incident-flow edges 5 and flow-off edges 6.

Figure 2:
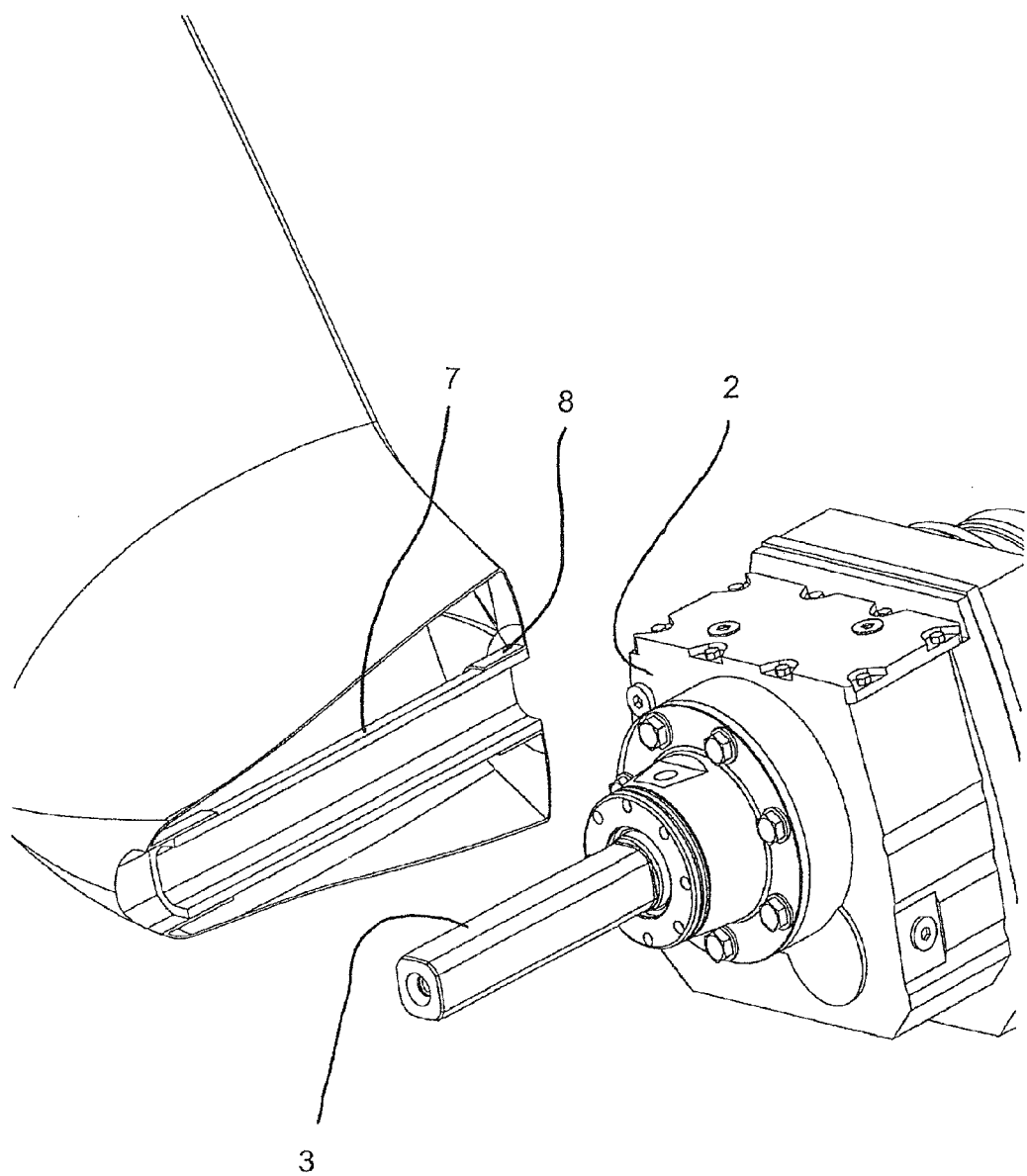
FIG. 2 shows a perspective view of the polygonal shaft and of a cut-away view of the propeller.
Figure 3:
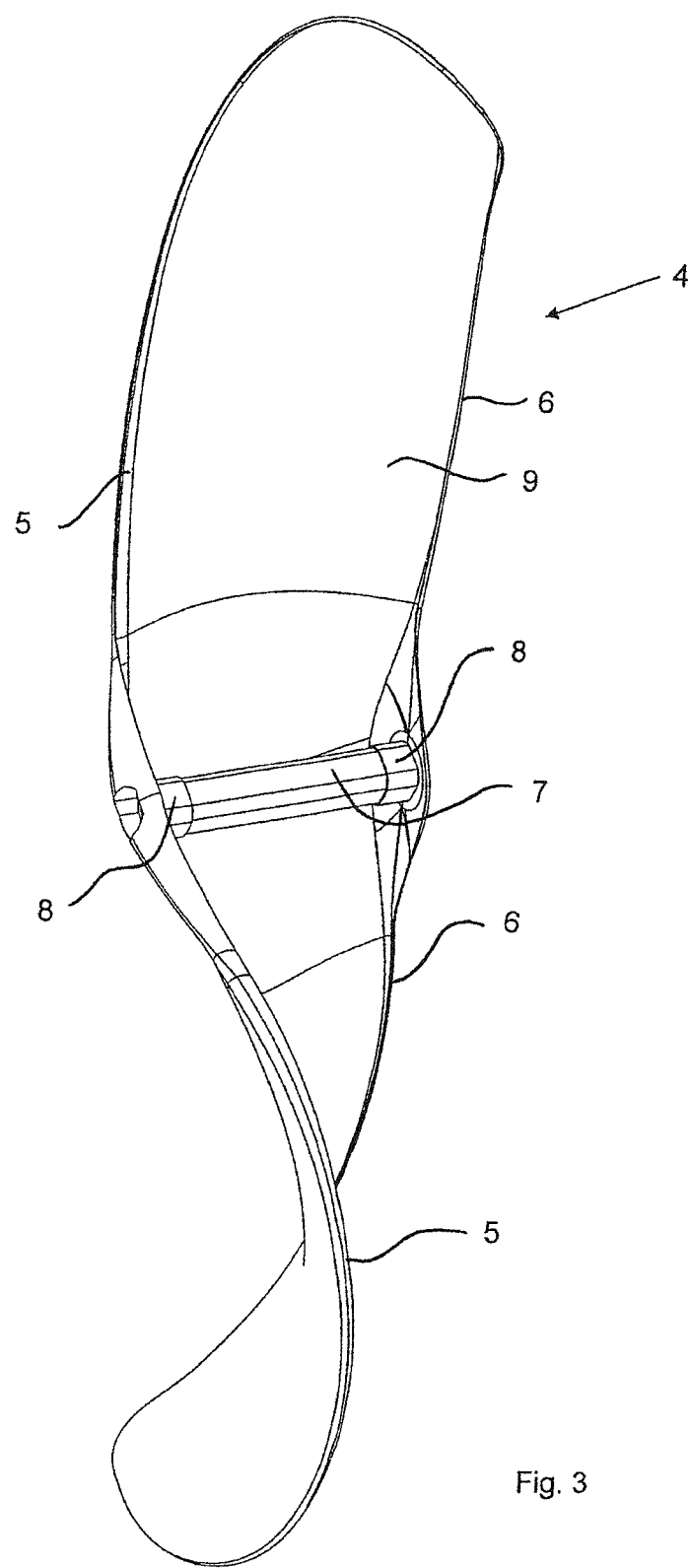
FIG. 3 shows a perspective view of the propeller that has been broken open in part.

As can be seen in particular from FIGS. 2 and 3, the propeller 4 is formed from a hollow body, which for example can be produced from polymer reinforced with glass fibres. A hub of the propeller 4 comprises a sleeve 7, of which the inner circumference corresponds to the outer circumference of the polygonal shaft 3. The polygonal shaft 3 advantageously has four transmission surfaces. It may be a P4C profile. The sleeve 7 is expediently produced from a polymer reinforced with carbon fibres. Here, continuous fibres are advantageously used as carbon fibres. The sleeve 7 is attached via two flange-like endpieces 8 to an inner face of the hollow body. The endpieces 8 are expediently produced from polymer reinforced with glass fibres or carbon fibres. The sleeve 7 is attached to the endpieces 8 for example by means of adhesive bonding.

The hollow body forming the propeller 4 is advantageously formed from two half-shells. FIG. 3 shows one of the two half-shells 9. A joint line of the two half shells 9 runs approximately along the incident-flow edges 5 and the flow-off edges 6 of the propeller 4.

To produce the propeller 4, the half-shell 9 shown in FIG. 3 can be produced first for example, and the sleeve 7 can then be inserted and adhesively bonded to the endpieces 8 integrally moulded on the first half-shell 9. A second half-shell (not shown here) can then be adhesively bonded to the first half-shell 9 along approximately the incident-flow edges 5 and flow-off edges 6. The hollow body thus produced is then filled with foam using a polymer foam, for example polyurethane foam or the like.

In accordance with an embodiment, an outer side of the propeller 4 can be provided with a polymer layer reinforced with carbon fibres. Such an outer or sheathing layer contributes further to the strength of the propeller 4.

LIST OF REFERENCE SIGNS

1 submersible motor
2 gearing
3 polygonal shaft
4 propeller
5 incident-flow edge
6 flow-off edge
7 sleeve
8 endpiece
9 half-shell
B blade

The invention claimed is:

1. A horizontal agitator for producing a substantially horizontal flow in a wastewater treatment tank,
a propeller being installed on a polygonal shaft driven by means of a submersible motor,
wherein the propeller is produced form a first material, which is formed from a polymer reinforced with first fibres, and wherein the propeller as hub has a sleeve which corresponds to the outer shape of the polygonal shaft and which is produced from a second material which is different from the first material, wherein the second material is formed from a polymer reinforced with carbon fibres or aramid fibres.

2. The horizontal agitator according to claim 1, wherein the second fibres are continuous fibres.

3. The horizontal agitator according to claim 1, wherein the sleeve is produced by winding and laminating the second fibres around a core corresponding to the shape of the polygonal shaft.

4. The horizontal agitator according to claim 1, wherein the sleeve is adhesively bonded to the first material.

5. The horizontal agitator according to claim 1, wherein the first fibres are glass fibres.

6. The horizontal agitator according to claim 1, wherein a surface of the propeller is coated at least in portions with a layer produced from a third material.

7. The horizontal agitator according to claim 6, wherein the third material is formed from polymer reinforced with second carbon fibres.

8. The horizontal agitator according to claim 7, wherein the second carbon fibres are present in the form of a woven fabric, knitted fabric or short fibres.

\* \* \* \* \*